(12) United States Patent
Need et al.

(10) Patent No.: US 7,823,157 B2
(45) Date of Patent: Oct. 26, 2010

(54) DYNAMIC QUEUE FOR USE IN THREADED COMPUTING ENVIRONMENT

(75) Inventors: Dwayne Need, Woodinville, WA (US); Michael John Hillberg, Kirkland, WA (US); Nicholas M. Kramer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1585 days.

(21) Appl. No.: 10/716,111

(22) Filed: Nov. 18, 2003

(65) Prior Publication Data

US 2005/0108719 A1    May 19, 2005

(51) Int. Cl.
*G06F 9/46* (2006.01)
(52) U.S. Cl. ..................................................... 718/108
(58) Field of Classification Search .................. 718/104, 718/107; 395/650, 704; 707/100; 719/314
See application file for complete search history.

(56) References Cited

U.S. PATENT DOCUMENTS 5,129,084 A * 7/1992 Kelly et al. .................. 718/104
6,293,712 B1 * 9/2001 Coutant ....................... 717/155
6,954,933 B2 * 10/2005 Stall ............................ 719/314
2002/0019824 A1 * 2/2002 Holder et al. ................ 707/100
2004/0133893 A1 * 7/2004 Carbone et al. ............. 718/107

OTHER PUBLICATIONS

Banga et al. ("Resource containers: A new facility for resource management in server system", USENIX Association, Third Symposium on Operating Systems Design and Implementation, OSDI, 1999).*

* cited by examiner

*Primary Examiner*—Li B Zhen
*Assistant Examiner*—Eric C Wai
(74) *Attorney, Agent, or Firm*—Shook, Hardy & Bacon LLP

(57) ABSTRACT

The present invention provides a dynamic queue for managing jobs in a threaded computing environment. Jobs may be placed in the queue, which may be maintained within a context of the computing environment, at a given priority level. The priority of jobs within the queue and the receipt time of each job is maintained. A job may also be placed within the queue with triggers that, if met, will result in the priority of the job being changed or will result in the job being removed from the queue entirely. Methods in accordance with the present invention also provide a method for raising an exception should multiple threads seek to access objects within a single context. Methods in accordance with the present invention also provide compatibility with prior computing systems and methodologies by providing for integration of prior static queues with dynamic queues in accordance with the present invention, and by providing methods for a given thread to be pinned to a particular context of a computing environment.

4 Claims, 7 Drawing Sheets

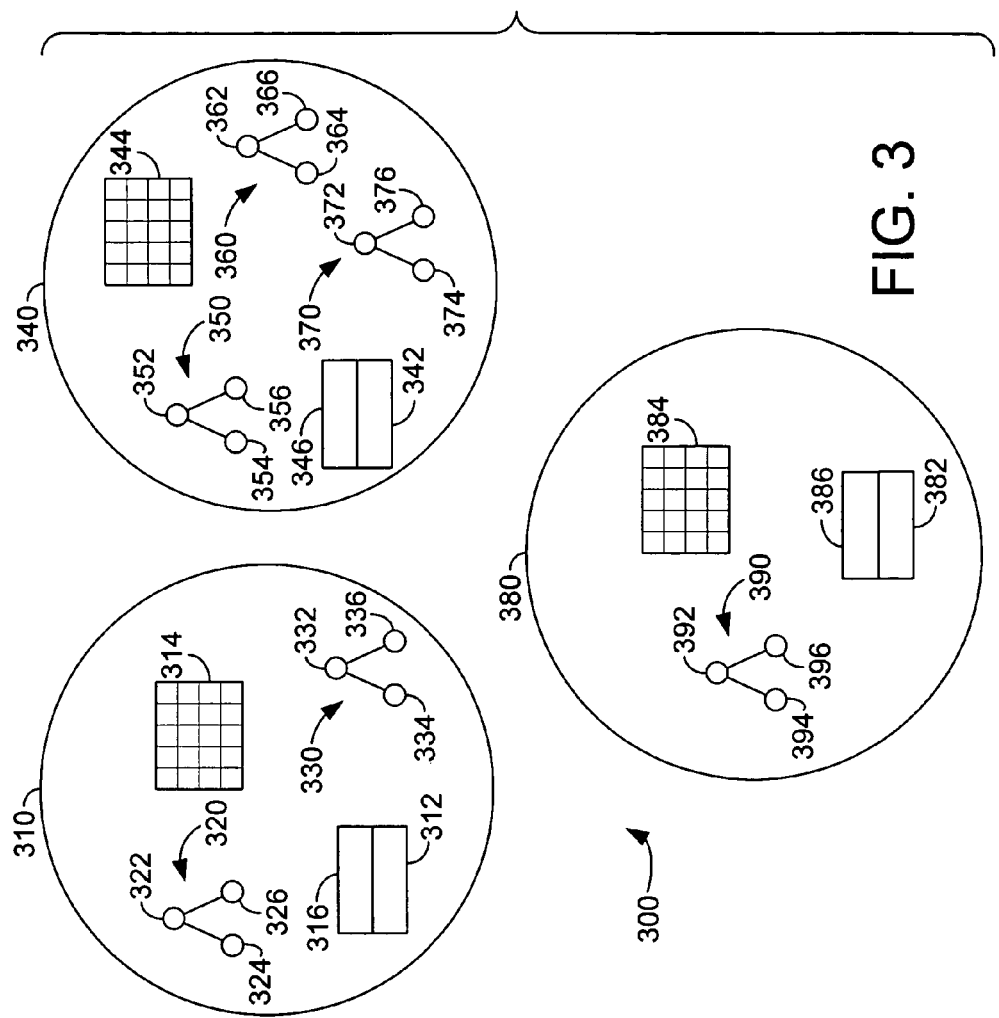
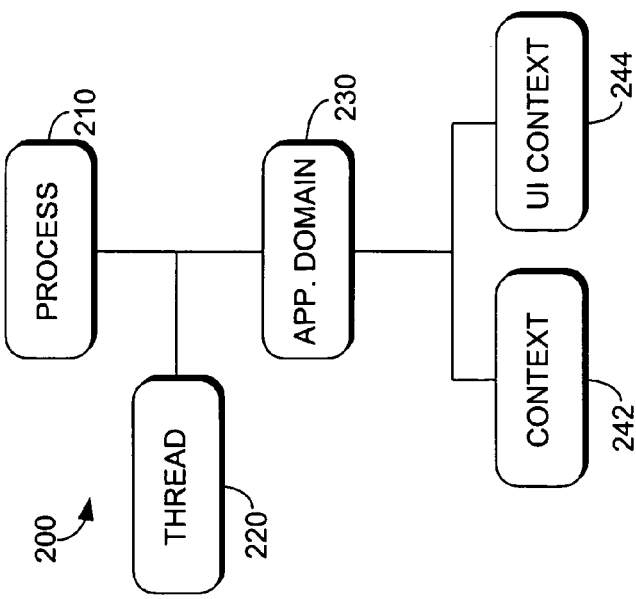
FIG. 3
FIG. 2

DYNAMIC QUEUE FOR USE IN THREADED COMPUTING ENVIRONMENT

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention relates to the field of computer software. More particularly, the present invention relates to the dynamic management of job queues within a context of a threaded computing environment.

BACKGROUND OF THE INVENTION

Computing has become a ubiquitous part of every day life. Computing systems, such as personal computers, have become a fixture in both the home and office. As the capabilities of computing hardware has increased, and as the complexity of tasks performed on computers has increased, the demands upon the operating systems that manage operations in a computing environment have likewise increased.

A modern personal computer may typically be capable of operating multiple processes simultaneously, with each process performing jobs using one or more threads. The threads of a process perform the individual tasks of computing, which may be broken into specific jobs to be processed.

Each job to be processed may be placed in one of a plurality of queues to await processing, the jobs in a queue potentially, but not necessarily, being interrelated. Queues may be prioritized, so that jobs having a high priority will be processed before jobs having a lower priority. A queue of jobs to be performed may exist within a programming construct often referred to by those skilled in the art as a context. A context may contain a variety of objects, and may further contain a queue of jobs to be processed, and other information relevant to performing operations within that context. One context that may be familiar to many computer users is the user interface context. The user interface context is the context within which output is provided to a user, for example through a computer screen, and through which input is received, for example via a keyboard or mouse. Any number of other contexts may exist within a computing system beyond a user interface context.

To maintain the integrity of computer processing and computer data, care must be taken in the design of a computing system. This is particularly true in the design of an operating system that coordinates the allocation of computing resources. For example, an operating system may require that only one thread may manipulate an object or data at a given time. If multiple threads seek to access or manipulate the same object or the same data simultaneously, the result to the data and to the operations of a computing system are unpredictable, and can include data corruption.

Beyond assuring that only one thread may access a given object or data at a single time, a computer operating system should also seek to optimize the performance of a computing system. One way to optimize the performance of a computing system is to assign a priority to jobs when they are received into a queue within a context. The jobs may thereafter be performed by threads in priority order. In this scenario, a job remains in the queue at its assigned priority until the job is performed by a thread. While such a static queue model has served well in past computing systems and operating systems, a dynamic queue model may be beneficial given the increasing complexity of computing systems.

Even as new approaches to computing systems and operating systems are being developed to take advantage of new computing capabilities, it is useful to maintain what is referred to in the art as backward compatibility as much as possible. Backward compatibility refers to the ability of a computer system to operate prior generations of software applications in a newer operating system. While a number of approaches may be used to obtain backward compatibility, many of these approaches can increase the resources required to run the operating system and add to the complexity of the system, with corresponding increased opportunity for system failures and system crashes. Accordingly, it is often desirable to provide for backward compatibility in an elegant fashion that maintains the stability of the new operating system while still permitting older software applications to operate.

BRIEF SUMMARY OF THE INVENTION

The present invention provides a dynamic queue that permits the priority assigned to jobs to be altered while a job is pending in the queue. The dynamic queue in accordance with the present invention may further maintain both a priority and a receipt time for each pending job, so that jobs having the same priority may be processed the order in which they where received. Various triggers may be provided to alter the priority assigned to a job pending in a queue or to abort the job and remove it from the queue entirely. Methods in accordance with the present invention may be used to require a thread to obtain exclusive access to a context before operating on an object in the context. An exception may be raised if a thread accessing an object has not obtained exclusive access to the context containing the object. Further methods in accordance with the present invention may allow information, such as settings and dictionaries, to be maintained by contexts and be temporarily assigned to a thread while a thread is operating within a context to allow backward compatibility. Further methods in accordance with the present invention providing for backward compatibility include the integration of a dynamic queue in accordance with the present invention with a static queue such that jobs may be performed in a logical fashion from both the dynamic queue and the static queue.

BRIEF DESCRIPTION OF THE SEVERAL VIEWS OF THE DRAWINGS

FIG. 2 illustrates a hierarchical representation of processes, threads, the application domain, and contexts in a computing environment;

FIG. 3 illustrates a plurality of contexts within a computing environment;

DETAILED DESCRIPTION OF THE INVENTION

Figure 1:
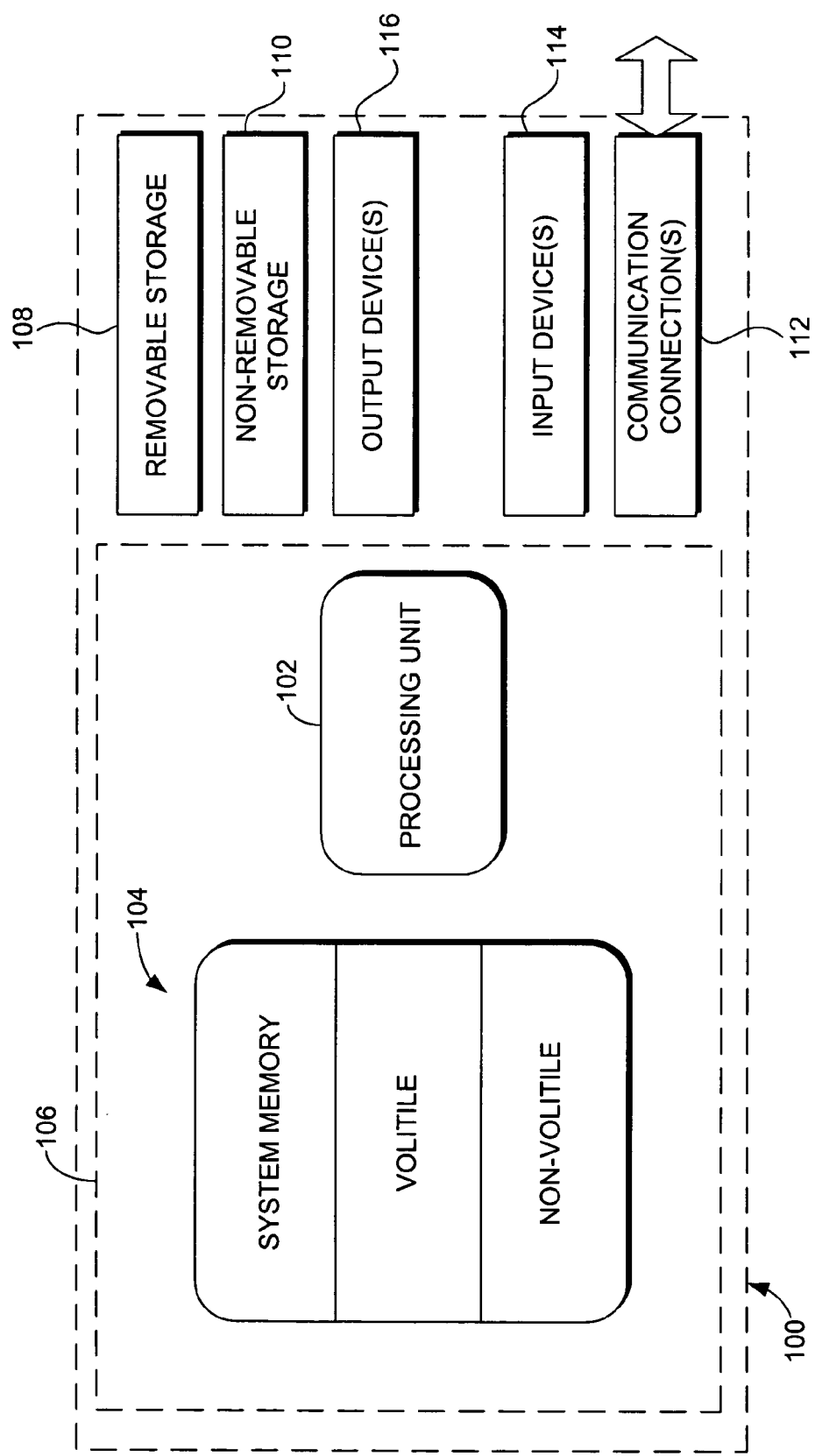
FIG. 1 illustrates an exemplary computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tap, magnetic disk storage or other magnetic storage devices, or any other medium which can be used to store the desired information and which can be accessed by device 100. Any such computer storage media may be part of device 100.

Device 100 may also contain communication connection(s) 112 that allow the device to communicate with other devices. Communication connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Device 100 may include a variety of computer readable media. Computer readable media can be any available media that can be accessed by a computer and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Device 100 may also have input device(s) 114 such as key board, mouse, pin, voice input device, touch input device, stylus, etc. Output device(s) 116 such as a display, speakers, printer, etc. may also be included. All these devices are well known in the art and need not be discussed at length here.

Referring now to FIG. 2, a hierarchical representation of computing operations 200 is illustrated. Computing process 210 may have one or more thread 220 operating under it. In the application domain 230 of the computing environment 200 there exists contexts, such as context 242 and the user interface context 244. Objects may exist within context 242 and user interface context 244. Objects within a context are accessed by threads to perform computing operations.

Referring now to FIG. 3, a computing environment 300 comprising a plurality of contexts is illustrated. A first context 310 may comprise a first tree 320 comprising a first object 322, a second object 324, and a third object 326. Context 310 may also contain a second tree 330 comprising a first object 332, a second object 334, and a third object 336. Context 310 may also comprise a context queue 314, a context dictionary 312, and context settings 316. Queue 314 may comprise a prioritized set of jobs to be performed within context 310 by threads. Dictionary 312 and settings 316 may comprise a single entity containing data associated with context 310. Dictionary 312 may comprise information from any source that may be useful for a thread performing jobs from queue 314. Data included in dictionary 312 need not be understood by the operating system. Settings 316 may comprise well known data, such as cultural information, with defined uses that may be useful in job processing performed by threads in context 310. Data in settings 316 may be accessed by application programming interfaces often referred to as APIs.

Computing environment 300 may further comprise a second context 340. Second context 340 may comprise a first tree 350 comprising a first object 352, a second object 354, and a third object 356. Context 340 may further comprise a second tree 360 comprising a first object 362, a second object 364, and a third object 366. Context 340 may further comprise a third tree 370 comprising a first object 372, a second object 374, and a third object 376. Context 340 may also comprise a context queue 344, a context dictionary 342, and context settings 346. Queue 344 may comprise a prioritized set of jobs to be performed within the context 340 by threads. Dictionary 342 and settings 346 may comprise a single entity containing data associated with context 340. Dictionary 342 may comprise information from any source that may be useful for a thread performing jobs from queue 344. Data included in dictionary 342 need not be understood by the operating system. Settings 346 may comprise well known data, such as cultural information, with defined uses that may be useful in job processing performed by threads in context 310. Data in settings 346 may be accessed by application programming interfaces often referred to as APIs.

Computing environment 300 may further comprise a third context 380. Third context 380 may comprise a tree 390 comprising a first object 392, a second object 394, and a third object 396. Context 380 may also comprise a context queue 384, a context dictionary 382, and context settings 386. Queue 384 may comprise a prioritized set of jobs to be performed within context 380 by threads. Dictionary 382 and settings 386 may comprise a single entity containing data associated with context 380. Dictionary 382 may comprise information from any source that may be useful for a thread performing jobs from queue 384. Data included in dictionary 382 need not be understood by the operating system. Settings 386 may comprise well known data, such as cultural information, with defined uses that may be useful in job processing performed by threads in context 310. Data in settings 386 may be accessed by application programming interfaces often referred to as APIs.

With further reference to FIG. 3, one skilled in the art will realize that a computing environment such as environment 300 may have more or fewer than the three contexts illustrated in FIG. 3. One skilled in the art will further realize that a tree may contain more or fewer than three objects, as is illustrated for convenience in FIG. 3. Further, the number of trees and objects within a context may vary beyond the ranges illustrated in FIG. 3, which are presented for exemplary purposes only.

Figure 4:
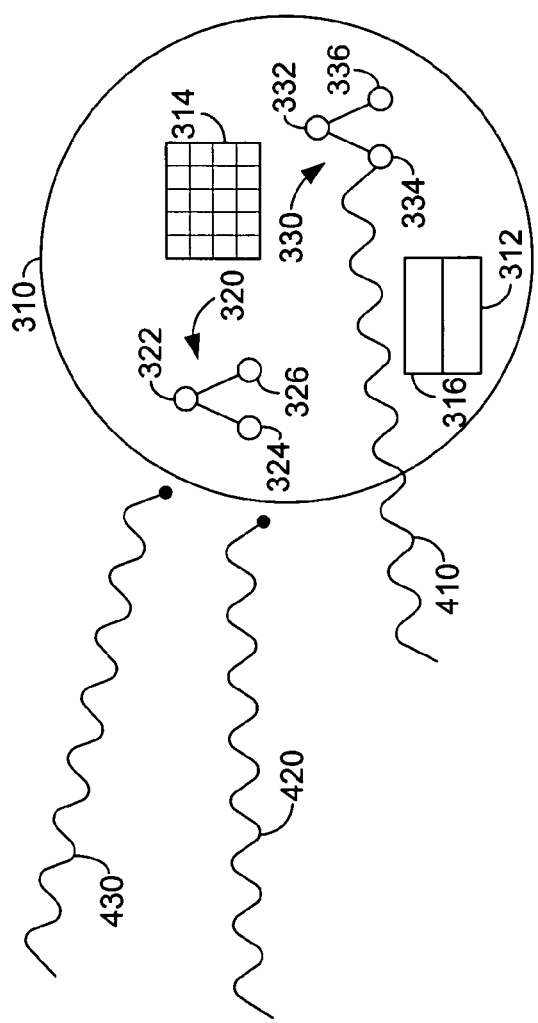
FIG. 4 illustrates a computing context and threads within a computing environment.

Referring now to FIG. 4, the first context 310 of FIG. 3 is illustrated with a plurality of threads. The first context 310 may be the user interface context. A first thread 410 has entered context 310 to access object 334. An example of pseudo-code one skilled in the art could use to represent the process of obtaining access to context 310 containing object 334, wherein object 334 is referred to as object A, is:

A. Context.Enter ( );
    A. DoSomething ( );
    A. Context.Exit ( );

Second thread 420 may request to access the first context 310. When a request to access a context is received, it is determined whether that context is presently being accessed by another thread. If the context is presently being accessed by another thread, the request to access the context is denied. If the context is not presently being accessed by another thread, the request to access the context may be allowed. In the example illustrated in FIG. 4, second thread 420 is prevented from accessing context 310 and any object within first context 310 while another thread, in this case first thread 410, is accessing the first context 310. Third thread 430 further seeks to access first context 310 but, likewise, is prevented from doing so while another thread is accessing first context 310.

One way to determine whether a thread may access a context is through the use of a context record, associated with each thread. Such a context record may be, for example, a data field associated with a thread. The context record may be updated when the thread with which the context record is associated is allowed to access a context, such that the most recent entry in the context record will indicate the context presently being accessed by the thread. When a thread accesses an object within a context, the thread's context record may be checked to verify that the most recent entry in the context matches the context containing the object and, if they do not match an exception may be raised.

Figure 5:
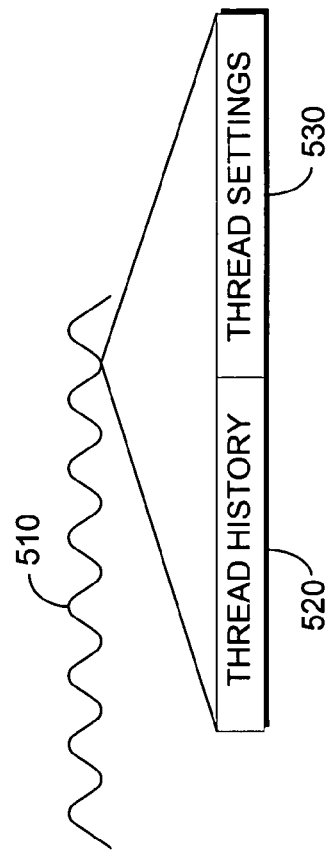
FIG. 5 illustrates information contained in a thread within a computing environment.

Referring now to FIG. 5, a thread 510 is illustrated in greater detail. Thread 510 may include historical information 520 and thread settings 530. Historical information 520 and thread settings 530 may comprise data fields associated with thread 510. Thread settings 530 may contain information, such as cultural information, that may be useful to thread 510 in processing jobs. Thread settings 530 may include one or more dictionaries. Historical information 520 may contain information regarding the history of the threads operations, such as contexts accessed by thread 510, and may be used as a context record. While all information necessary for the operation of a thread, such as thread 510, may be in thread settings 530, methods in accordance with the present invention allow information useful to threads in processing jobs to be context specific, rather than thread specific.

Figure 6:
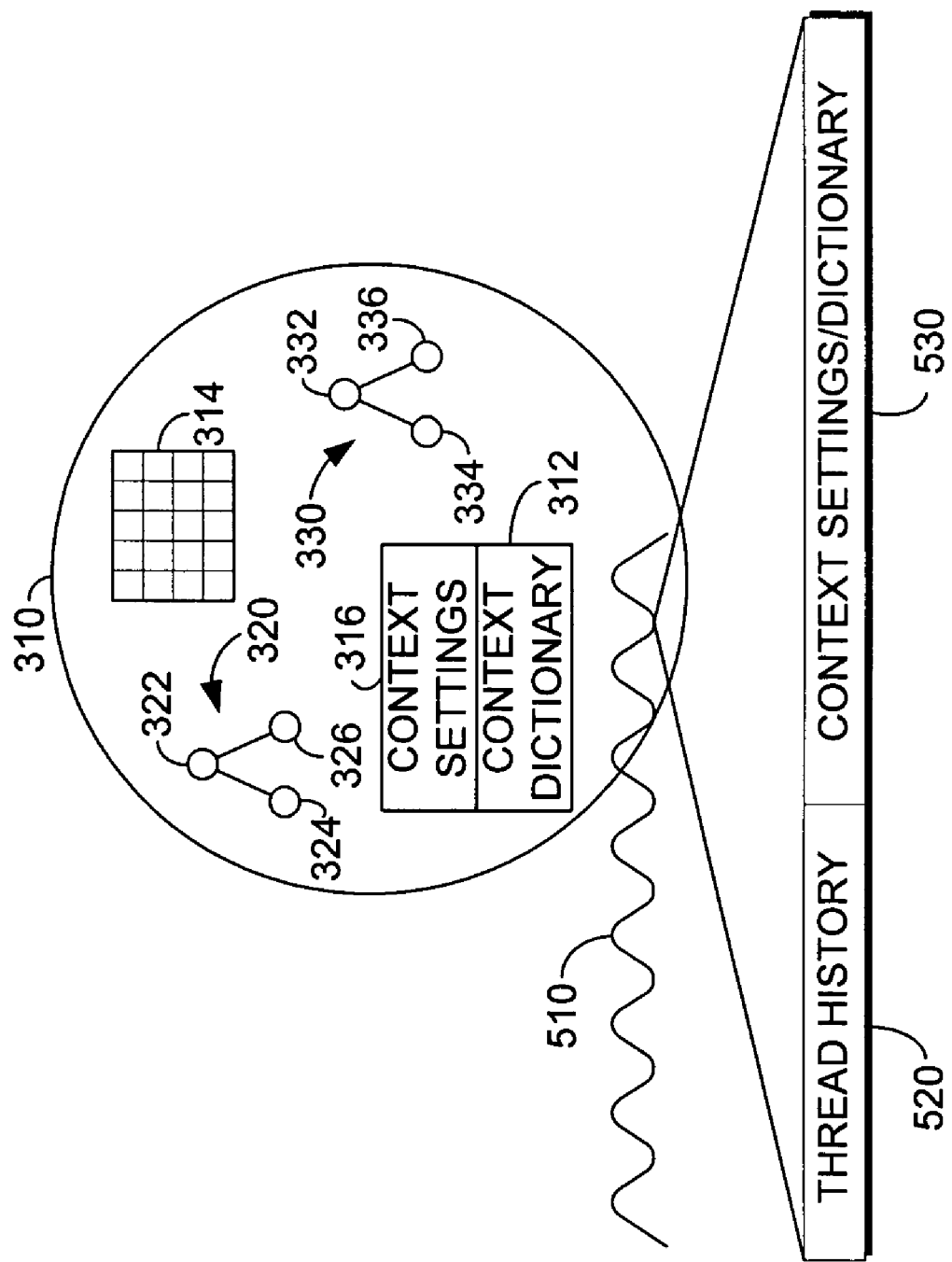
FIG. 6 illustrates a thread accessing a context within a computing environment.

Referring now to FIG. 6, thread 510 is shown accessing context 310. Context 310 may be the user interface context. While operating within context 310 the thread settings 530 may become the context settings 316 maintained within context 310. Context dictionary 312 maintained within context 310 may likewise be placed within thread settings 530 while thread 510 operates within context 310. Thread settings 530 may comprise a data field associated with thread 510. Thread settings 530 may be restored to their prior content when thread 510 departs context 310. The system and method of adapting thread settings 530 to include the settings 316 and dictionary 312 from context 310 allows settings and dictionary information to be specified at the context level, rather than on a thread by thread basis. The use of context settings 316 and context dictionary 312 as thread settings 530 further allows additional services, such as catching exceptions caused by thread 510 while executing within context 310, to be provided. Historical information 520 may be updated when a thread enters and/or leaves context 310.

Figures 7, 8:
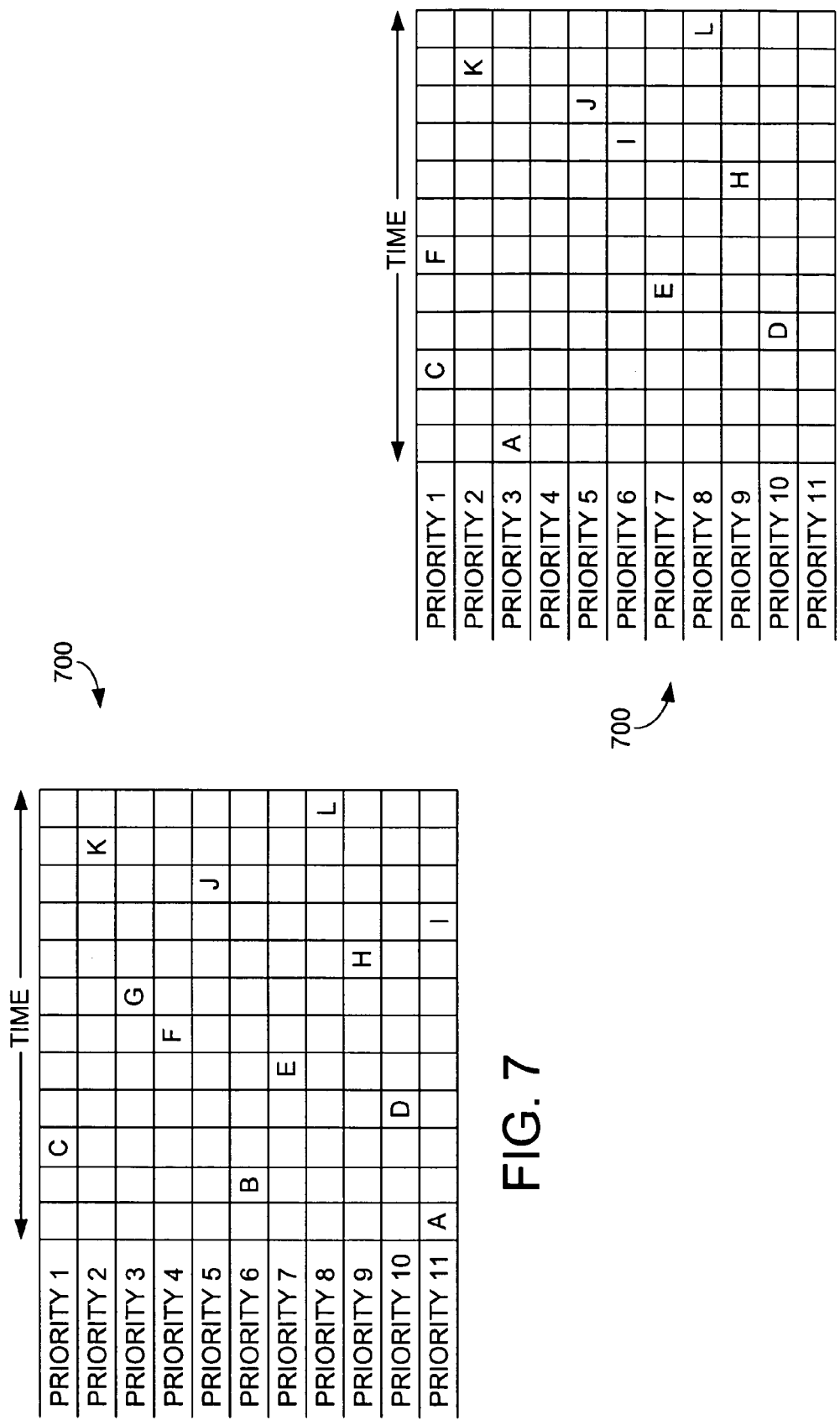
FIG. 7 illustrates a dynamic queue in accordance with the present invention.
FIG. 8 further illustrates the dynamic queue of FIG. 7.

Referring now to FIG. 7, a queue 700 in accordance with the present invention, such as may be maintained within a context, is illustrated. Within the queue 700 illustrated in FIG. 7, several jobs are pending, and are designated with letters A through L. A job may comprise a process to be executed, a priority, and a receipt time. A job may further comprise a trigger defining an event which will require an action to be taken with the job within the queue if the event occurs and an action to be taken with the job if the event defined by the trigger occurs. Each job within the queue is placed at a given priority in FIG. 7 ranging, in this example, from priority one to priority eleven, although one skilled in the art will realize that other designations may be used. One skilled in the art will realize that any number of priority levels may be used, and that the eleven priority levels illustrated in FIG. 7 and FIG. 8 are for exemplary purposes only. One skilled in the art will further realize that the number of jobs pending in queue 700 illustrated in FIG. 7 and FIG. 8 is exemplary only, and will further realize that any number of jobs may pend in a queue such as queue 700. As is further illustrated, each job in the queue corresponds to a given time. As illustrated in FIG. 7 and FIG. 8, time progresses from left to right. Accordingly, each job in queue 700 has both a priority and a time corresponding to that job.

In FIG. 7, for example, job A arrived at the first time increment and was placed at priority level eleven, the lowest priority level in queue 700. For example, priority level eleven may be "inactive" meaning that the job is to be deferred until an event, referred to herein as a trigger, occurs that will result in the priority level of the job being changed.

In processing jobs from the queue, jobs are processed in priority order from the highest priority, priority one, to the lowest priority, priority eleven. Thus, in processing jobs from queue 700 illustrated in FIG. 7, jobs having priority one will be processed first, meaning that job C would be processed before the other jobs in queue 700. After a job has been processed, it is removed from queue 700. Accordingly, after processing job C, no jobs having priority one will remain. Processing will then move to the next priority level, priority two, and job K will be processed. Work on jobs in the queue will continue, with the highest priority job being processed and then removed from queue 700, until queue 700 is empty or computing processes terminate. When multiple jobs having the same priority are present in the queue, the job having the earliest time will be processed first.

FIG. 8 illustrates queue 700, and further illustrates the dynamic properties of a queue in accordance with the present invention. In accordance with the present invention, a job in the queue may have triggers associated with it that will cause the job to change in priority or to be removed from the queue all together. This dynamic quality to a queue in accordance with the present invention may be useful for a variety of purposes, such as, for example, to promote in priority jobs that have become time critical, to remove from the queue jobs that, for whatever reason, are no longer necessary. In comparing queue 700 in FIG. 7 and queue 700 in FIG. 8, several changes in the priorities assigned to jobs have changed. For example, job A has been promoted from priority eleven to priority three. Job B has been aborted, in that it has been removed from queue 700. Job F has been promoted from priority four to priority one. Job G has been aborted and removed from queue 700 entirely. Job I has been promoted from priority eleven to priority six.

One example of pseudo-code one skilled in the art could use to manipulate an item within queue 700 is:

op=context.Post (item, ForegroundPriority);
    op.Priority=Background;
    op.Abort ( );

A further example of pseudo-code that could be used by one skilled in the art to schedule priority changes is:

op.SchedulePriorityChange (timeout, priority);

Triggers that result in the removal or change in priority of a job in a queue such as queue 700 may take a variety of forms. For example, a trigger that may be used in accordance with the present invention is a timeout. A timeout may occur if a predetermined amount of time expires after a job has been placed in a queue. For example, when a job is placed in a queue it may be placed in the queue at a given priority with instructions as to how long a timer to associated and the action to take with a job if the timer expires without the job being completed.

In further reference to FIG. 7 and FIG. 8, job A may have been placed at priority eleven when a process operating in the computing environment determined that job A would, at a later time, need to be performed in the context corresponding to queue 700. Job A may have been placed in queue 700 at priority eleven with a timeout value of fifty milliseconds and instructions to promote job A to priority three after fifty milliseconds pass. In this way, job A would not be processed from queue 700 earlier than necessary, but, because jobs of equal priority are processed in receipt time order, job A would be processed before other priority three jobs in queue 700, effectively holding the place for job A in queue 700 without requiring processing resources to be expired on job A until necessary.

Other triggers may be, for example, the completion of other processing, the receipt of a notification from the operating system, or nearly any other event in the computing environment. For example, job I may have been placed in queue 700, as shown in FIG. 7, at priority eleven with instructions to promote job I to priority six when the process placing job I in queue 700 returned a given value. One skilled in the art will appreciate that a variety of other triggers may be defined, and that triggers such as timeouts and the return of processing values may be used in a variety of ways to effectively manage jobs within a queue, such as queue 700. One skilled in the art will also appreciate that jobs may be lowered in priority as well as increased in priority as result of a trigger.

As is further illustrated in FIG. 7 and FIG. 8, jobs may be aborted by removing them from a queue such as queue 700 entirely. This is illustrated, for example, with regard to job B. A variety of reasons may lead to a job being removed from queue 700. One example of the many circumstances wherein a job may be aborted from a queue is the rendering of computer animation to coincide with other output of a computing application. If the animation is not rendered to coincide with audio or other output there is no need to proceed with rendering the animation. Accordingly, a trigger may provide for the removal of such a job from queue 700 altogether.

One skilled in the art should note that, in accordance with the present invention, a thread may perform operations on a queue without being in the context containing the queue, meaning that the queue is thread safe. A thread outside of a context may post work to the context quickly, without having to wait to enter the context to post the work. Other queue operations, such as posting, aborting and changing the priority of job may likewise be performed by a thread without the thread entering the context containing the queue.

Queues in accordance with the present invention may be particularly useful with user interface messages. One skilled in the art will appreciate, however, that queues in accordance with the present invention may be used for purposes other than the queuing of user interface messages.

Figure 9:
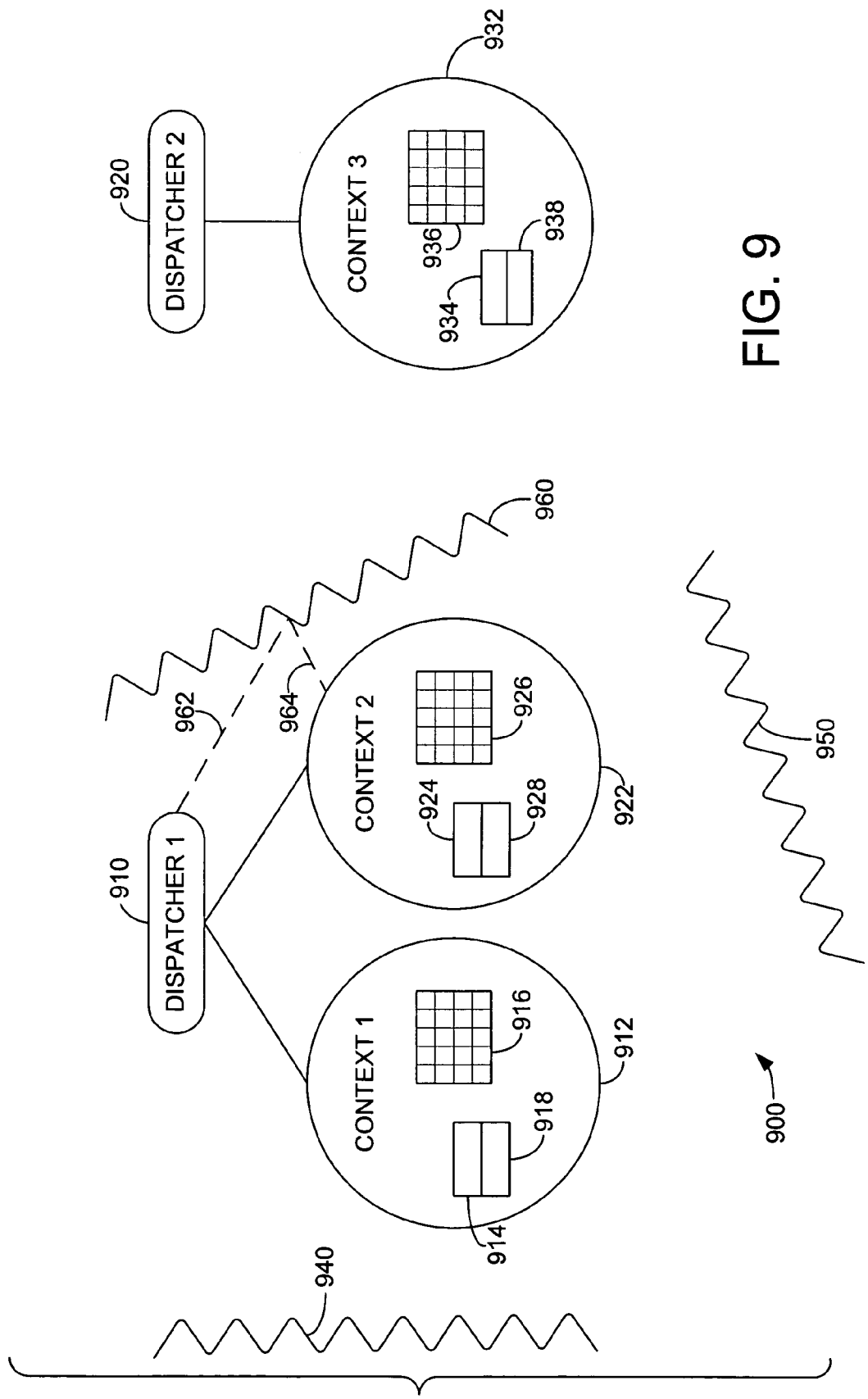
FIG. 9 illustrates the pinning of a thread to a context by a dispatcher in accordance with the present invention.

Referring now to FIG. 9, a computing environment 900 is illustrated wherein jobs are being processed from queues within contexts, the processing of jobs being managed by one or more dispatchers. A first dispatcher 910 manages processing in a first context 912 and a second context 922. First context 912 may contain any number of objects, a context dictionary 914, a context queue 916, and context settings 918. Second context 922 may contain any number of objects, a context dictionary 924, a context queue 926, and context settings 928. A second dispatcher 920 manages the processing of jobs in a third context 932. Third context 932 may contain any number of objects, a context dictionary 934, a context queue 936, and context settings 938. Within the computing environment 900, a variety of threads may be operating. Some of these threads, including a first thread 940, a second thread 950 and a third thread 960 are illustrated in FIG. 9. A dispatcher, such as the first dispatcher 910, may use a thread to process jobs within the context queue, such as queue 926. In this example, dispatcher 910 may use any thread to process a job from queue 926. However, in some computing applications, it may be useful or necessary to process all jobs from a queue within a context, such as queue 926 within context 922, using the same thread. As illustrated in FIG. 9, first dispatcher 910 has accessed 962 the third thread 960 to establish a pin 964 of the third thread 960 to the second context 922. The pin 964 will require that all jobs within queue 926 of the second context 922 be processed using thread 960. A pin such as pin 964 may last for various periods of time, for example until the application requiring the pin is concluded.

Figure 10:
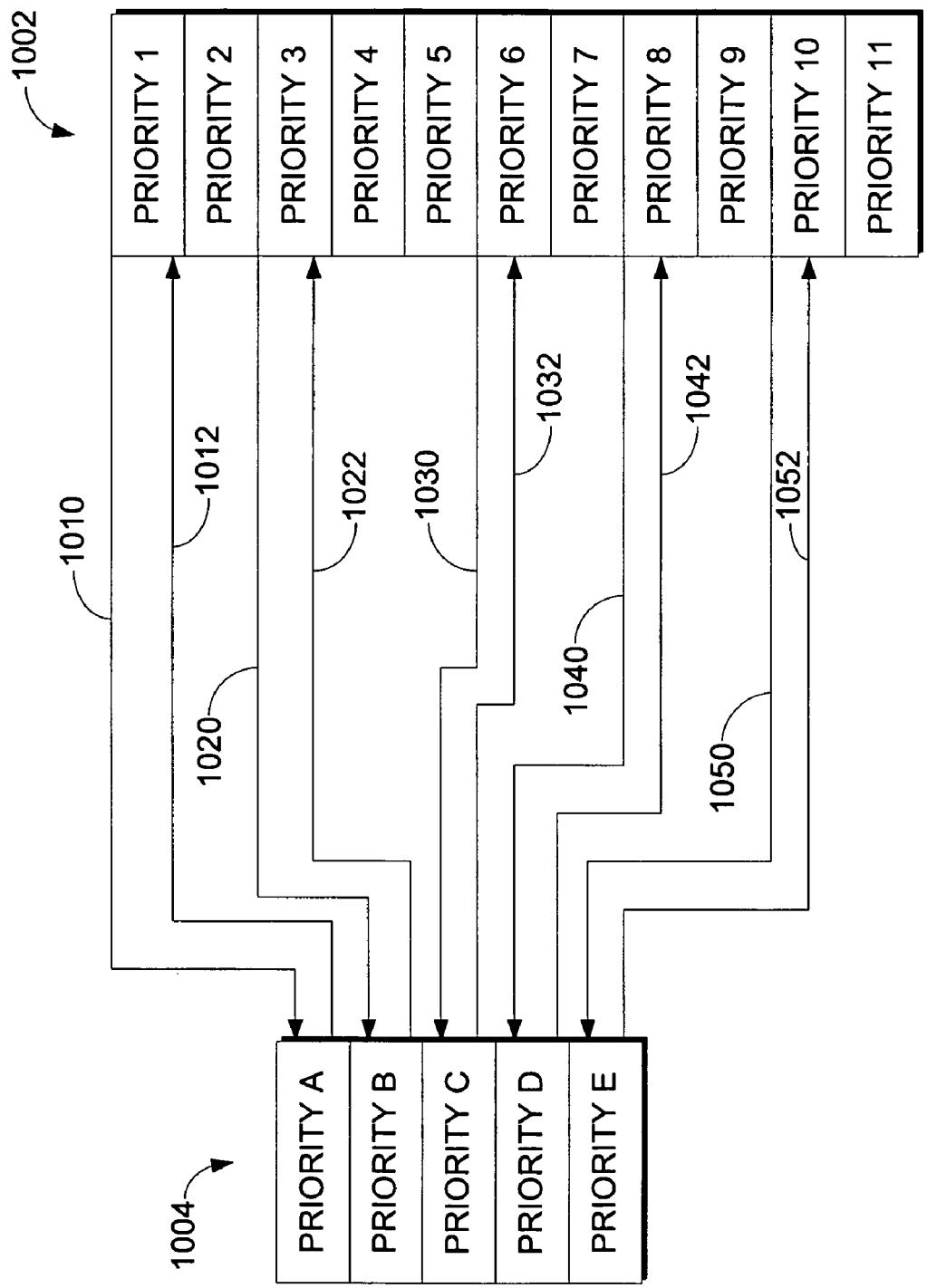
FIG. 10 illustrates the integration of a static queue and a dynamic queue in accordance with the present invention.

Referring now to FIG. 10, a method of integrating a dynamic queue in accordance with the present invention with a static queue to obtain backward compatibility while processing jobs from both the dynamic and the static queue in a logical fashion is illustrated. As illustrated in FIG. 10, the static queue 1004 comprises five priority levels designated priority A, priority B, priority C, priority D, and priority E. The dynamic queue 1002 is shown with priority levels ranging from priority one to priority eleven. One skilled in the art will appreciate that both the dynamic queue 1002 and the static queue 1004 may have varying numbers of priorities associated with them other than those illustrated in FIG. 10. While not necessary, dynamic queue 1002 may be a dynamic queue that includes both a priority designation and a receipt time for jobs within the queue.

As illustrated in FIG. 10, in processing jobs from the dynamic queue 1002 a dispatcher or other system periodically checks the static queue 1004 to determine whether there exists any jobs to be performed at a given priority level. This check of the static queue 1004 occurs prior to checking given priority levels in the dynamic queue 1002. For example, as illustrated in FIG. 10, before checking for jobs in priority one of dynamic queue 1002, a dispatcher checks 1010 whether there are any jobs in priority A of the static queue 1004. If there are no jobs in priority A, or if all jobs in priority A have been processed, the dispatcher returns 1012 to priority one of dynamic queue 1002. After processing all jobs at priority one of dynamic queue 1002, jobs at priority two of dynamic queue 1002 may be processed. In the example illustrated in FIG. 10, prior to checking to determine whether there are priority three jobs to be performed in dynamic queue 1002, dispatcher checks 1020 priority B jobs in the static queue 1004. If there are no priority B jobs to be performed, or if all priority B jobs have been processed, dispatcher returns 1022 to process any priority three jobs in the dynamic queue 1002. After processing all jobs at priority three in the dynamic queue 1002, priority four and then priority five jobs in the dynamic queue 1002 may be processed in turn. As further illustrated in the example shown in FIG. 10, prior to checking for priority six jobs in dynamic queue 1000 to dispatcher checks 1030 for priority C jobs in the static queue 1004. If there are no priority C jobs to process, or if all priority C jobs have been processed, dispatcher returns 1032 to process any priority six jobs in dynamic queue 1002. After processing all jobs at priority six of the dynamic queue 1002, jobs at priority seven of the dynamic queue 1002 may be processed. In the example illustrated in FIG. 10, before dispatcher checks for priority eight jobs in dynamic queue 1002, dispatcher checks 1040 for priority D jobs in static queue 1004. If there are no priority D jobs to be performed, or if all priority D jobs have been processed, dispatcher returns 1042 to check for priority eight jobs in dynamic queue 1002. After processing all jobs at priority eight in the dynamic queue 1002, jobs at priority nine of the dynamic queue 1002 may be processed. As further illustrated in the example of FIG. 10, before checking for priority ten jobs in dynamic queue 1002, dispatcher checks 1050 for priority E jobs in static queue 1004. If there are no priority E jobs to process, or if all priority E jobs have been processed, dispatcher returns 1052 to check for priority ten jobs in dynamic queue 1002. After processing all jobs at priority ten in the dynamic queue 1002, jobs at priority eleven of the dynamic queue 1002 may be processed. Of course, the correspondence between priority levels in the dynamic queue 1002 and the static queue 1004 may vary from the correspondence illustrated in FIG. 10. The correspondence between priority levels may be simplified by grouping the priority levels of the static queue 1004 into a smaller number of groups, such as two groups, and defining a correspondence between the groups of priority levels of the static queue 1004 and the priority levels of dynamic queue 1002.

The method of integrating a dynamic queue 1002 and a static queue 1004 illustrated in FIG. 10 may be implemented using a variety of approaches. For example, messages corresponding to jobs in the dynamic queue 1002 may be posted to the static queue 1004 at two priorities, such as foreground and background or high and low. Messages may be posted using APIs such as PostItem and SetTimer. The dispatcher may then process the static queue 1004, and when a posted message is dispatched from the static queue 1004 the corresponding job may be dispatched from the dynamic queue 1002. Another example of suitable approach for integrating a dynamic queue 1002 and a static queue 1004 is to control the processing of each using a dispatcher and to dispatch jobs in priority order using a predefined relationship between the priority levels of the static queue 1004 and the dynamic queue 1002, such as the relationship illustrated in FIG. 10.

In further reference to FIG. 10, one skilled in the art will appreciate that the correspondence of priorities in the dynamic queue 1002 and the static queue 1004 may vary. For example, a dispatcher need not check 1020 for priority B jobs in the static queue 1004 prior to beginning to process priority three jobs in the dynamic queue 1002. Rather, the relationship between the priority levels of a static queue such as static queue 1004 and a dynamic queue, such as dynamic queue 1002 may be determined so as to best fit the needs of a computer application or an operating system.

One skilled in the art will appreciate that static queue 1004 may comprise a Win32 message queue. If static queue 1004 is a Win32 message queue, the retrieval of only the high-priority items in the Win32 message queue may be performed using the Win32 PeekMessage API by passing a predefined message as a parameter.

As can be seen, the present invention and its equivalents are well-adapted to providing an improved method and system for establishing a dynamic queue, integrating a dynamic queue and a static queue, changing the priority of pending jobs in a dynamic queue, aborting pending jobs in a dynamic queue, and managing the access of threads to a context. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described. Not all steps of the aforementioned flow diagrams are necessary steps.

What is claimed is:

1. In a threaded computing environment having a plurality of contexts, each context capable of containing a queue, context settings, a context dictionary, and objects, a method for allocating the access of threads to a user interface context, the method comprising:

receiving a request to access the user interface context from a first thread, wherein the user interface context is configured to receive input from a user, to provide output to the user, and to maintain the context settings and the context dictionary;

determining whether the user interface context is presently being accessed by a second thread;

when the user interface context is presently being accessed by the second thread, denying the request to access the user interface context received from the first thread; and when the user interface context is not presently being accessed by the second thread, performing a process to allow for backward compatibility comprising:

(a) allowing the request to access the user interface context received from the first thread;

(b) updating a context record maintained by the first thread to reflect that access is allowed to the user interface context;

(c) verifying that the first thread has obtained exclusive access to the user interface context by checking the context record by way of the process comprising:

(i) incident to the first thread accessing an object in the user interface context, checking a most recent entry in the context record provided within the first thread, wherein the context record identifies the contexts accessed by the first thread, and wherein the most recent entry in the context record indicates the context that is presently being accessed by the first thread;

(ii) determining whether the most recent entry in the context record matches the user interface context associated with the object being presently accessed; and (iii) when the most recent entry in the context record does not match the user interface context associated with the object being accessed, raising an exception; and (d) temporarily assigning to the first thread the context settings and the context dictionary maintained by the user interface context while the first thread is operating within the user interface context, wherein assigning comprises placing the context settings and the context dictionary within thread settings of the first thread upon accessing the user interface context, and wherein settings of the context settings and dictionary information of the context dictionary are specified at a context level, rather than on a thread level.

2. The method for allocating the access of threads to a user interface context of claim 1, the method further comprising restoring the thread settings when a thread departs the user interface context.

3. One or more computer-storage media having computer-executable instructions embodied thereon that, when executed, perform a method for allocating the access of threads to a user interface context in a threaded computing environment having a plurality of contexts, each context capable of containing a queue, context settings, a context dictionary, and objects, the method for allocating the access of threads to a user interface context comprising:

receiving a request to access the user interface context from a first thread, wherein the user interface context comprises one or more objects, wherein the user interface context is configured to receive input from a user, to provide output to the user, and to maintain the context settings and the context dictionary, wherein the context dictionary includes information from a plurality of sources;

determining whether the user interface context is presently being accessed by a second thread;

when the user interface context is presently being accessed by the second thread, denying the request to access the user interface context received from the first thread; and when the user interface context is not presently being accessed by the second thread, performing a process to allow for backward compatibility comprising:

(a) allowing the request to access the user interface context received from the first thread;

(b) updating a context record maintained by the first thread to reflect that access is allowed to the user interface context;

(c) verifying that the first thread has obtained exclusive access to the user interface context by checking the context record by way of the process comprising:

(i) incident to the first thread accessing an object in the user interface context, checking a most recent entry in the context record provided within the first thread, wherein the context record identifies the contexts accessed by the first thread, and wherein the most recent entry in the context record indicates the context that is presently being accessed by the first thread;

(ii) determining whether the most recent entry in the context record matches the user interface context associated with the object being presently accessed; and (iii) when the most recent entry in the context record does not match the user interface context associated with the object being accessed, raising an exception; and (d) temporarily assigning to the first thread the context settings and the context dictionary maintained by the user interface context while the first thread is operating within the user interface context, wherein assigning comprises placing the context settings and the context dictionary within thread settings of the first thread upon accessing the user interface context, and wherein settings of the context settings and dictionary information of the context dictionary are specified at a context level, rather than on a thread level.

4. The one or more computer-storage media of claim 3, the method for allocating the access of threads to a user interface further comprising restoring the thread settings when a thread departs the user interface context.

* * * * *